US008118552B2

(12) United States Patent
Nies

(10) Patent No.: US 8,118,552 B2
(45) Date of Patent: Feb. 21, 2012

(54) APPARATUS AND METHOD FOR MANIPULATING A COMPONENT OF A WIND TURBINE

(75) Inventor: Jacob Johannes Nies, Zwolle (NL)

(73) Assignee: General Electric Company, Schenectady, NY (US)

( * ) Notice: Subject to any disclaimer, the term of this patent is extended or adjusted under 35 U.S.C. 154(b) by 6 days.

(21) Appl. No.: 12/574,023

(22) Filed: Oct. 6, 2009

(65) Prior Publication Data

US 2010/0135797 A1   Jun. 3, 2010

(51) Int. Cl.
*F03D 11/00* (2006.01)
(52) U.S. Cl. .................. 416/1; 416/142; 416/DIG. 6
(58) Field of Classification Search .................. 416/142, 416/143, 146 R, DIG. 6, 246, 1
See application file for complete search history.

(56) References Cited

U.S. PATENT DOCUMENTS

| 6,364,609 | B1 | 4/2002 | Barnes | |
|---|---|---|---|---|
| 7,207,777 | B2 * | 4/2007 | Bervang | 416/119 |
| 7,360,310 | B2 | 4/2008 | Bagepalli et al. | |
| 7,735,808 | B2 * | 6/2010 | Viladomiu i Guarro et al. | 254/278 |
| 2006/0151767 | A1 | 7/2006 | Wobben | |
| 2006/0175465 | A1 | 8/2006 | Teichert | |
| 2007/0151194 | A1 * | 7/2007 | Livingston et al. | 52/651.05 |
| 2007/0290426 | A1 | 12/2007 | Trede et al. | |
| 2008/0307647 | A1 | 12/2008 | Kessler | |
| 2010/0028152 | A1 * | 2/2010 | Numajiri et al. | 416/146 R |
| 2010/0139062 | A1 * | 6/2010 | Reed et al. | 29/23.51 |

FOREIGN PATENT DOCUMENTS

| EP | 1239150 A2 * | 9/2002 |
|---|---|---|
| JP | 2004293455 A * | 10/2004 |
| WO | 2008089763 A2 | 7/2008 |

* cited by examiner

*Primary Examiner* — Edward Look
*Assistant Examiner* — Jesse Prager
(74) *Attorney, Agent, or Firm* — Cantor Colburn LLP

(57) ABSTRACT

A wind turbine includes a tower member a yaw system, and a wind energy collection system. The wind energy collection system includes a central hub and a plurality of blade members. The wind turbine further includes a component manipulating system operatively coupled between at least one of the plurality of blade members and the tower member. The component manipulating system includes a blade member support structure including a first end pivotally connected relative to the tower member that extends to a second end operatively coupled to the one of the plurality of blade members, and a winching system operatively connected to the one of the plurality of blade members and the tower member. The winching system is selectively operated to shift the one of the plurality of blade members relative to the tower member in order to enable serving of the wind turbine.

20 Claims, 6 Drawing Sheets

APPARATUS AND METHOD FOR MANIPULATING A COMPONENT OF A WIND TURBINE

BACKGROUND OF THE INVENTION

The subject matter disclosed herein relates to wind turbines and, more particularly, to an apparatus and method for servicing a component of a wind turbine.

Alternative sources of energy are under development in order to meet the world's power demand. One such alternative energy source is wind power. Wind generators convert energy provided by air currents into electricity. The air currents rotate large rotor blades or propellers that are mounted in nacelles at the top of a tower. The blades spin a rotor relative to a stator to generate an electrical current. The rate of rotation is controlled by varying blade pitch as well as through the use of various braking systems. During high wind conditions, the blade pitch is adjusted to spill wind energy in order to limit rotational speed. Occasionally, the braking system is employed to further prevent the blades from achieving high rotational speeds. During low wind conditions, the blade pitch is adjusted in order to capture as much wind energy as possible.

Over time, the wind generators require maintenance. Debris, birds and the like oftentimes impact the blades and cause damage. In addition, blade bearings may require replacement in order to ensure continued proper operation. In order to effectuate these maintenance tasks, a large crane is required. More specifically, maintenance tasks such as blade and/or bearing replacement require the use of a large crane to lower the blade to the ground.

BRIEF DESCRIPTION OF THE INVENTION

According to one aspect of the invention, a wind turbine includes a tower member having a first end portion that extends to a second end portion, a yaw system rotatably mounted to the second end portion of the tower member, and a wind energy collection system operatively coupled to the yaw system. The wind energy collection system includes a central hub and a plurality of blade members. Each of the plurality of blade members includes a root end portion operatively coupled to the hub, a tip portion that is cantilevered from the hub, and an intermediate portion. The wind turbine further includes a component manipulating system operatively coupled between at least one of the plurality of blade members and the tower member. The component manipulating system includes a first blade member support structure including a first end pivotally connected relative to the tower member that extends to a second end operatively coupled to the one of the plurality of blade members, and a winching system operatively connected to the one of the plurality of blade members and the tower member. The winching system is selectively operated to shift the one of the plurality of blade members relative to the tower member in order to enable serving of the wind turbine.

According to another aspect of the invention, a method of servicing a wind turbine includes supporting a portion of one of a plurality of blade members through a blade member support structure operatively coupled to a wind turbine tower member member, disconnecting the one of the plurality of blade members from a central hub, and lowering the one of the plurality of blade members axially relative to the tower member.

According to yet another aspect of the invention, a wind turbine component manipulating system includes a blade member support structure including a first end that extends to a second end. The first end is configured and disposed to pivotally connected to a wind turbine tower member and the second end is configured and disposed to operatively connect to one of a plurality of wind turbine blade members. The component manipulating system further includes a winching system. The winching system is configured and disposed to operatively connect between the one of the plurality of wind turbine blade members and the wind turbine tower member.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
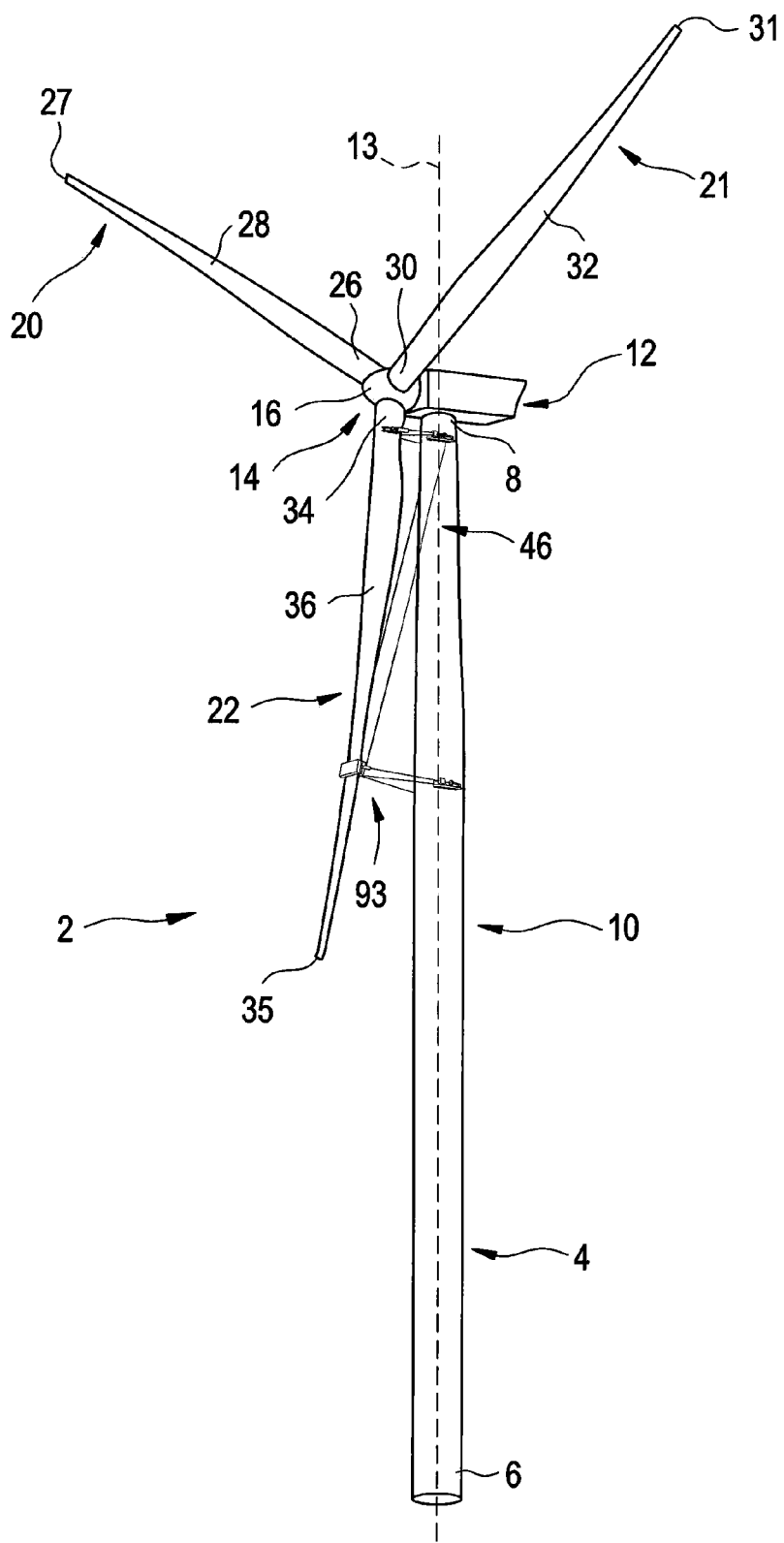
FIG. 1 is a partial perspective view of a wind generator including a component manipulating system in accordance with an exemplary embodiment.

With reference to FIG. 1, a wind turbine constructed in accordance with an exemplary embodiment is indicated generally at 2. Wind turbine 2 can be readily supported upon land or, at sea in order to capture wind currents that are converted into electrical power. Towards that end, wind turbine 2 includes a tower member 4 having a first end portion 6 that extends to a second end portion 8 through an intermediate portion 10. Wind turbine 2 further includes a yaw system/nacelle 12 that is positioned at a second end portion 8 of tower member 4. As will be discussed more fully below, yaw system 12 rotates about an axis 13 defined by tower member 4. Wind turbine 2 is further shown to include a wind energy collection system 14 operatively coupled to yaw system 12. Wind energy collection system 14 includes a central hub 16 having attached thereto a plurality of blade members 20-22. Blade members 20-22 collectively rotate in response to wind currents. Blade members 20-22 are also individually rotatable to adjust pitch in order to capture as much energy as possible from the wind currents. In addition, blade members 20-22 are selectively positionable through rotation of yaw system 12 in order to face prevailing wind currents.

In the exemplary embodiment shown, blade member 20 includes a root portion 26 that extends to a tip portion 27 through an intermediate portion 28. Root portion 26 is operatively coupled to central hub 16. Similarly, blade member 21 includes a root portion 30 that extends to a tip portion 31 through an intermediate portion 32. Likewise, blade member 22 includes a root portion 34 that extends to a tip portion 35 through an intermediate portion 36. As discussed above, blade members 20-22 rotate in response to wind currents. The rotation of blade members 20-22 is coupled to a generator (not shown) arranged within the yaw system 12. The generator transforms energy from the wind currents to electrical energy. Over time, it is necessary to move, shift and/or manipulate components of the wind turbine in order to perform various maintenance tasks on wind energy collection system 14. Toward that end, wind turbine 2 includes a component manipulating system 46.

Figure 2:
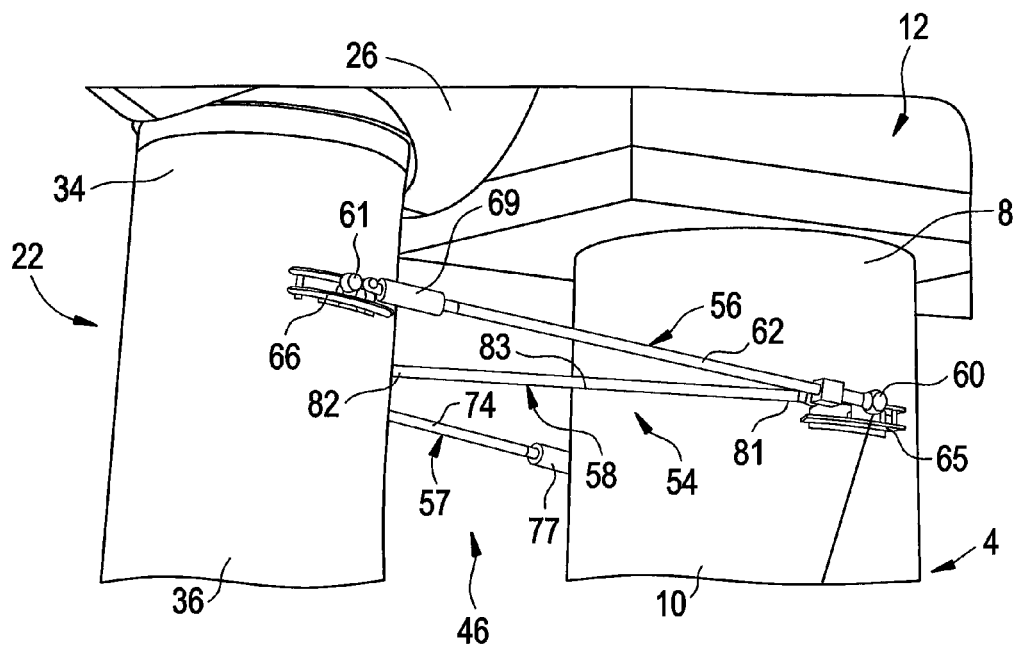
FIG. 2 is a partial perspective view of a first blade member support structure portion of the component manipulating system in accordance with an exemplary embodiment.
Figure 3:
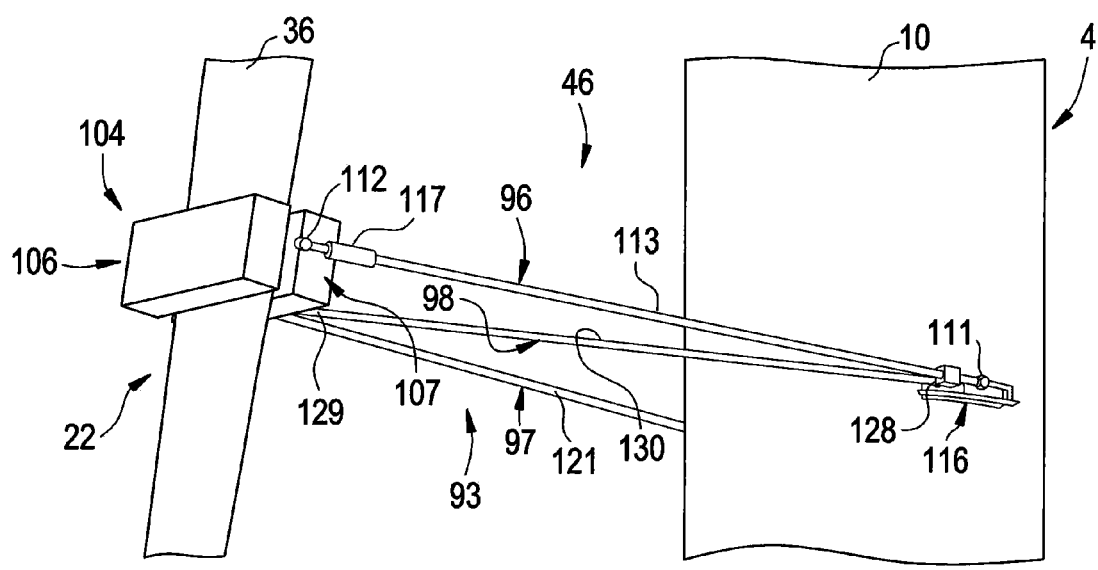
FIG. 3 is a partial perspective view of a second blade member support structure of the component manipulating system in accordance with an exemplary embodiment.
Figure 4:
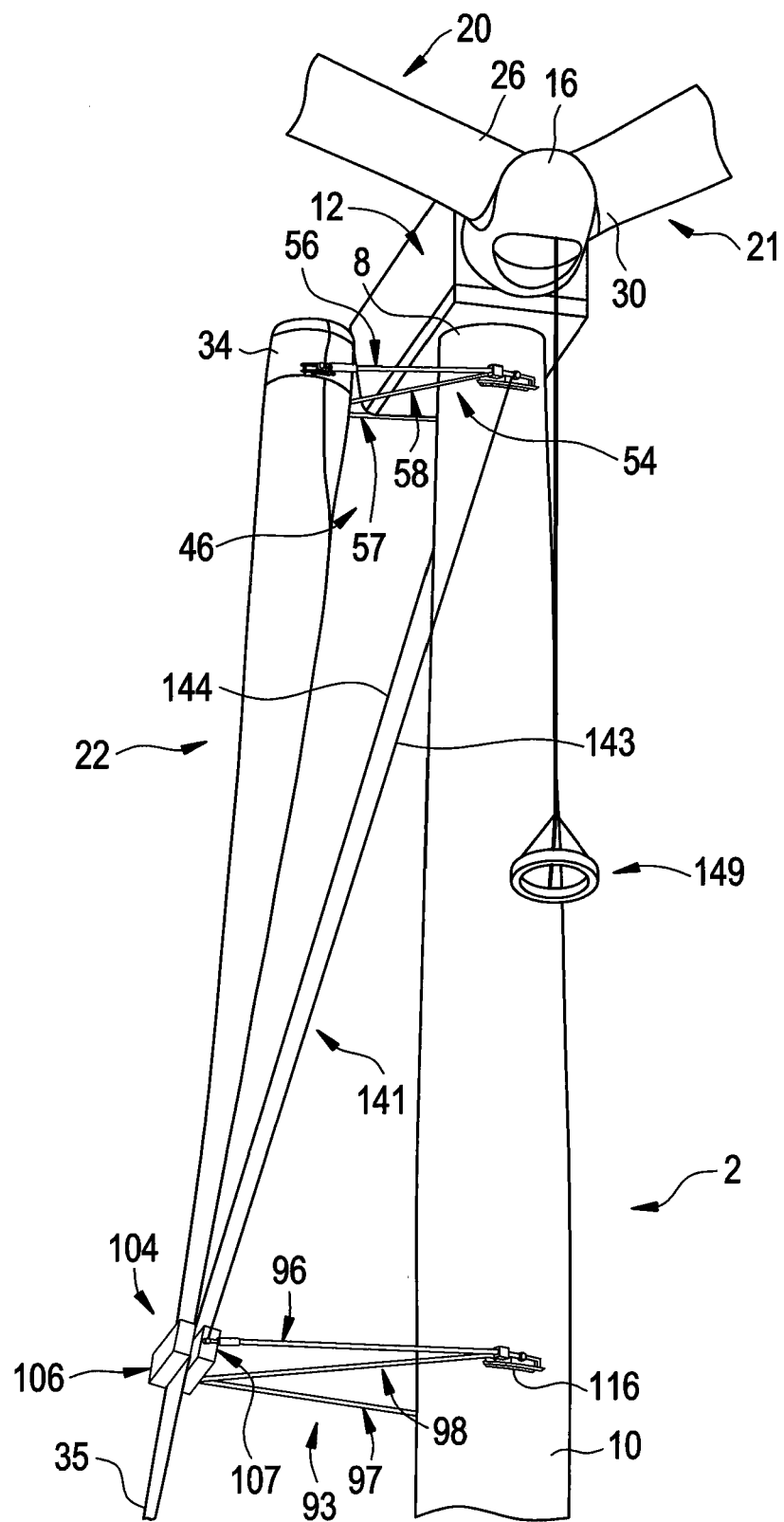
FIG. 4 is a partial perspective view of a bearing replacement operation using the component manipulating system of FIG. 1.

Reference will now be made to FIGS. 2-4 in describing component manipulating system 46 constructed in accordance with an exemplary embodiment. As is shown, component manipulating system 46 includes a first blade member support structure 54 having a first support member 56, a second support member 57 and a third support member 58. First support member 56 includes a first end portion 60 that extends to a second end portion 61 through an intermediate portion 62. First end portion 60 is pivotally mounted to tower member 4 through a mounting member 65. Similarly, second end portion 61 is pivotally mounted to root portion 34 of blade member 22 through a mounting element 66. In the exemplary embodiment shown, mounting member 65 and mounting element 66 are shown fixedly secured to tower member 4 and blade member 22, respectively. However, it should be understood that various other attachment methods such as straps, bands, and the like can also be employed such that mounting member 65 and mounting element 66 can be readily detachable from their respective components. First support member 56 is also shown to include an extensible member 69. Extensible member 69 is selectively positionable to adjust a longitudinal length of first support member 56.

In a manner similar to that described above with respect to first support member 56, second support member 57 includes a first end portion (not shown) that extends to a second end portion (also not shown) through an intermediate portion 74. First end portion of second support member 57 is pivotally mounted to tower member 4 through a mounting member (also not shown) while second end portion of second support member 57 is pivotally mounted to root portion 34 of blade member 32 through a mounting element (not shown). In a manner also similar to that described above, second support member 57 includes an extensible member 77. In further accordance with the exemplary embodiment, third support member 58 includes a first end portion 81 that is mounted to first end portion 60 of first support member 56. First end portion 81 extends to a second end portion 82 through an intermediate portion 83. Second end portion 82 is connected to the second end of second support member 57. In this manner, third support member 58 provides structural support and enhances stability of blade member support structure 54.

As best shown in FIG. 3, component manipulating system 46 also includes a second blade member support structure 93. Second blade member support structure 93 includes a first support element 96, a second support element 97, and a third support element 98. Second blade member support structure 93 further includes a block member 104 having a first block element 106 and a second block element 107. First and second block elements 106 and 107 are detachably mounted to intermediate portion 36 of blade member 22. Of course the particular positioning of block member 104 could vary without departing from the scope of the invention.

First support element 96 includes a first end section 111 that extends to a second end section 112 through an intermediate section 113. First end section 111 is pivotally mounted to tower member 4 through a mounting member 116. Second end section 112 of first support element 96 is pivotally mounted to block member 104. In a manner similar to that described above, first support element 96 includes an extensible member 117. Similarly, second support element 96 includes a first end section (not shown) that extends to a second end section (not shown) through an intermediate section 121. Second support element 97 also includes an extensible member (not shown). Finally, third support element 98 includes a first end section 128 that extends to a second end section 129 through an intermediate section 130. First end section 128 is connected to first end section 111 of first support element 96 while second end section 129 is connected to the second end section of second support element 97. With this arrangement, third support element 98 provides structural support and stability to second blade member support structure 93. Although not shown, it should be understood that third support element 98 could include an extensible member that enhances connectivity between first end section 111 and the second end section of second support element 97. At this point it should be understood that first and second blade member support structures 54 and 93 could include, for example rigid platforms that pivot relative to the tower. The platforms could include adjustment systems that are employed to manipulate blade members 20-22 as well as facilitate human access to the various locations on wind turbine 2.

In further accordance with the exemplary embodiment, component manipulating system 46 includes a winching system 141. Winching system 141 includes a first cable 143 and a second cable 144. First and second cables 143, 144 extend between first blade member support structure 54 and second blade member support structure 93. First cable 143 extends between first end portion 60 of first support member 56 and second end section 112 of first support element 96. Similarly, second cable 144 extends between the first end section (not shown) of second support member 57 and the second end portion (not shown) of second support element 96. Winching system 141 also includes an operating system (not shown) that is selectively operated to lower blade member 22 relative to hub 16. That is, first and second cables 143 and 144 are connected to, for example, a pulley system, a drum system or the like arranged at second end portion 8 of tower member 4. With this arrangement, first and second cables 143 and 144 are extended and/or retracted in order to allow blade member 22 to pivot about first and second blade member support structures 54 and 93 as will be discussed more fully below. Of course it should also be understood that winching system 141 could include a dedicated attachment point provided on tower member 4 or nacelle 12.

Over time, it may become necessary to replace bearings associated with each blade member 20-22. In order to replace the bearing, the associated blade member must be removed from central hub 16. In accordance with the exemplary embodiment, blade member 22 is loosened from central hub 16 as shown in FIG. 4. Cables 143 and 144 are extended to selectively lower blade member 22. As cables 143 and 144 extend, blade member 22 pivots about first and second blade member supports structures 54 and 93. Once blade member 22 is spaced from central hub 16, yaw system 12 pivots wind energy collection system 14 relative to tower member 4. In this manner, central hub 16 is now clear of blade member 22. At this point, a bearing, such as shown as 149, is selectively removed and lowered from central hub 16. After a replacement bearing 149 is installed, and yaw system 12 is pivoted back to position central hub 14 adjacent to blade member 22. In addition to operating yaw system 12, a pitch system (not shown) may also be operated to aide in final alignment of blade member 22, replacement bearing 149 and hub 16. At this point, cables 143 and 144 are retracted to selectively raise blade member 22 back to position. Once in position, blade member 22 is tightened and blade member support structures 54 and 93 are either removed from tower member 4 or utilized to service an additional blade member. With this arrangement, each of the blade members for a wind turbine can be readily serviced without the need for expensive crane operations and associated crane operating personnel.

Figure 5:
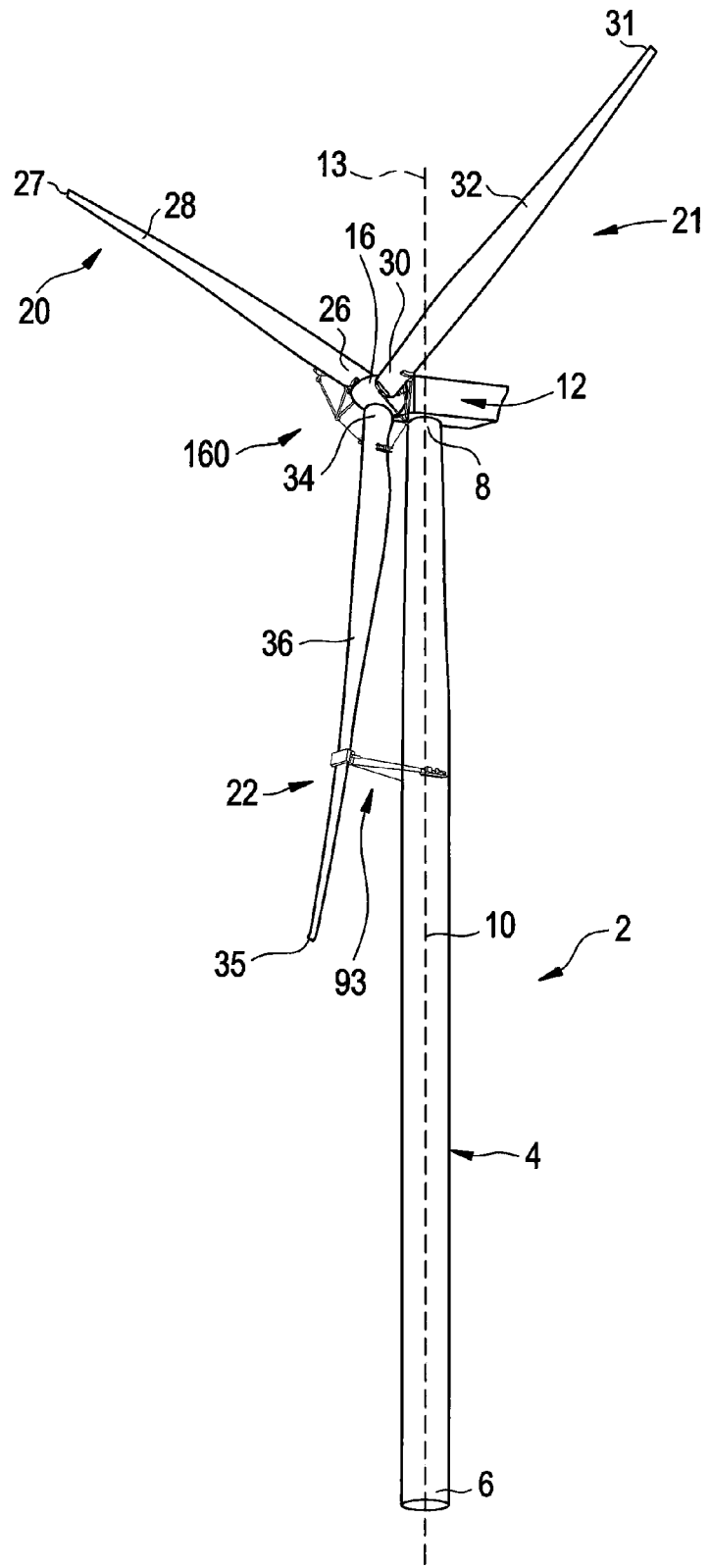
FIG. 5 is a partial perspective view of a wind generator including a component manipulating system in accordance with another exemplary embodiment.
Figure 6:
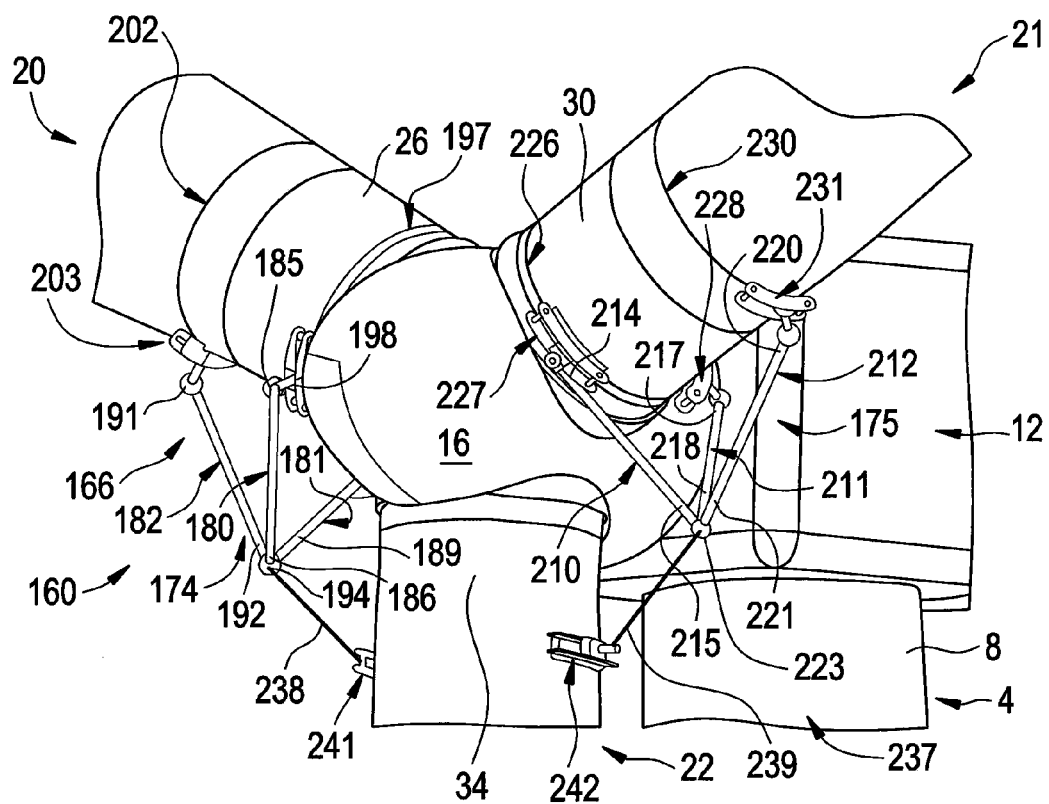
FIG. 6 is a partial perspective view of a first blade member support structure portion of the component manipulating system of FIG. 5; and, FIG. 7 is a partial perspective view of a bearing replacement operation using the component manipulating system of FIG. 5.
Figure 7:
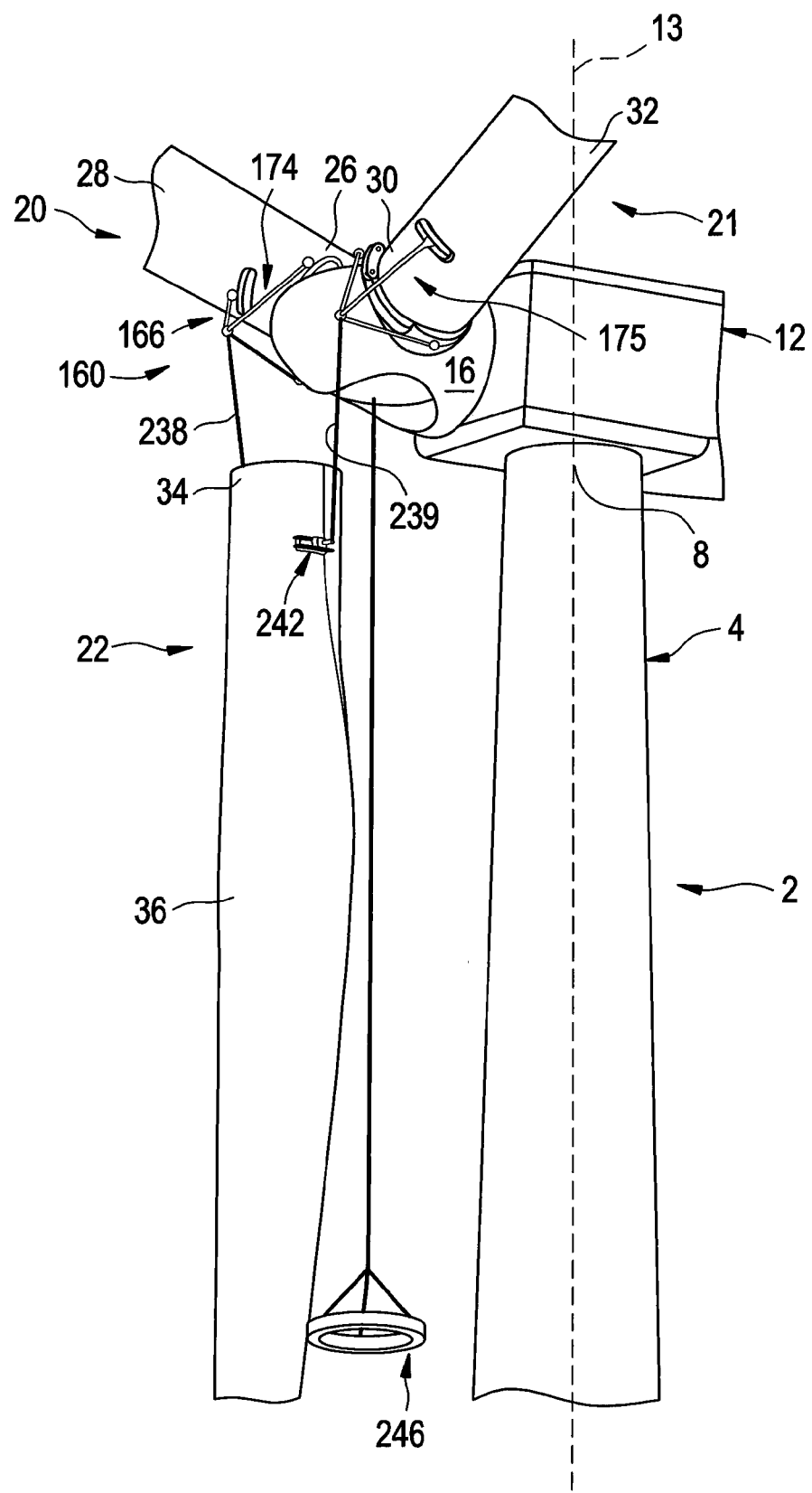

Reference will now be made to FIGS. 5-7 in describing a component manipulating system 160 constructed in accordance with another exemplary embodiment. As shown, component manipulating system 160 includes a first blade member support structure 166 and a second blade member support structure (not shown) similar to that described above in connection with component manipulating system 46. First blade member support structure 166 includes a first blade member support element 174 and second blade member support element 175. First blade member support element 174 is mounted to blade member 20 while second blade member support element 175 is mounted to blade member 21.

As best shown in FIG. 6, first blade member support element 174 includes a first support rod 180, a second support rod 181, and a third support rod 182. First support rod 180 includes a first end 185 mounted to blade member 20 that extends to a second end 186. Similarly, second support rod 181 includes a first end (not shown) mounted to blade member 22, which extends to a second end 189. Likewise, third support rod 182 includes a first end 191 coupled to blade member 22 that extends to a second end 192. Each of the second ends 186, 189 and 192 of first, second and third support rods 180-182 are collectively joined by a linking member 194. First end 185 of first support rod 180 and the second end (not shown) of second support rode 181 are connected to blade member 20 through a first strap element 197. More specifically, first end 185 of first support rod 180 is connected to a first buckle 198 connected to first strap element 197 while the second end (not shown) of second support rod 181 is connected to a second buckle (also not shown) coupled to strap element 197. First end 191 of third support rod 182 is connected to a second strap element 202 through a buckle 203. With this arrangement, each of the first, second and third support rods 180-182 are cantilevered from blade member 20.

In a manner similar to that described above, second blade member support element 175 includes a first support rod 210, a second support rod 211, and a third support rod 212. First support rod 210 includes a first end 214 that is operatively coupled to blade member 21 and that extends to a second end 215. Similarly, second support rod 211 includes a first end 217 that is operatively coupled to blade member 21 and that extends to a second end 218. Third support rod 212 includes a first end 220 also coupled to blade member 21 and which extends to a second end 221. Each of the second ends 215, 218 and 221 are joined by a linking member 223. In a manner similar to that described above, first ends 214 and 217 of first and second support rods are connected to a first strap element 226 through corresponding first and second buckles 227 and 228. First end 220 of third support rod 212 is coupled to a second strap element 230 through a buckle 231. Strap elements 197, 202, 226, and 230 provide a removable interface between first and second blade member support elements 174 and 175 and corresponding ones of the blade members 20-22. With this arrangement, first and second blade member support elements 174 and 175 are utilized to selectively lower one of the plurality of blade members 20-22 from central hub 16 in order to facilitate a maintenance operation. 22.

In further accordance with the exemplary embodiment, component manipulating system 160 includes a winching system 237 having a first cable 238 and a second cable 239. First cable 238 extends between linking member 194 and a mounting member 241 provided on blade member 22 while second cable 239 extends between linking member 223 and a mounting member 242 provided on an opposing side of blade member 22. Mounting members 241 and 242 can be fixedly secured to blade member 22 or attached via straps, bands, or the like in order to readily enable attachment and detachment. In a manner similar to that described above, winching system 237 also includes an operating system (not shown) that is selectively operated to raise and lower blade member 22 relative to hub 16. That is, first and second cables 238 and 239 are connected to, for example, a pulley system, a drum system or the like arranged at second end portion 8 of tower member 4. With this arrangement, first and second cables 238 and 239 are extended and/or retracted in order to lower blade member from central hub 16. Of course, winching system 141 can simply include cables having a fixed length, or an initial adjustable length cables such as a chain, that are manipulated through movements (pitch adjustments) of one, the other or both of blade members 20 and 21.

As best shown in FIG. 7, after attaching first and second blade member support elements 174 and 175 to blade members 20 and 21 respectively, winching system 237 is connected to blade member 22. At this point, blade member 22 is loosened from central hub 16. Once loosened, first and second cables 238 and 239 are extended to lower blade member 22 relative to central hub 16. After lowering blade member 22, blade members 20 and 21 are rotated about a longitudinal axis in order to shift blade member 22 away from central hub 16. That is, pitch adjustments are made to each blade member 20 and 22. The pitch adjustments result in a corresponding pivoting of first and second blade member support elements 174 and 175, which, in turn, shift blade member 22 away from tower member 4. At this point, a maintenance operation can be performed on internal components of central hub 16. In the exemplary embodiment shown, after removing blade member 22, a bearing 246 is removed and subsequently replaced. Of course, it should be understood that various other maintenance operations could also be performed. In any event, once bearing 246 is removed and replaced, additional pitch adjustments are made to blade members 20 and 21 in order to reposition blade member 20 relative to central hub 16. At this point, first and second cables 238 and 239 are retracted in order to raise blade member 22 back into position within central hub 16. Once properly positioned, blade member 22 is tightened and component manipulating system 160 can be removed.

In accordance with the exemplary embodiment shown, when blade member 22 is lowered relative to central hub 16, intermediate portion 36 is supported through second blade member support element 93. In this manner, blade member 22 pivots relative to tower member 4 and is supported in order to reduce movement during servicing. At this point, it should be understood that the present invention enables the servicing of a wind turbine without requiring costly ground support equipment such as a crane operation. In addition, the relative simplicity of the component manipulating system enables wind turbine to be serviced with a smaller maintenance crew and what is usually required to perform such maintenance duties.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A wind turbine comprising:
a tower member having a first end portion that extends to a second end portion;
a yaw system rotatably mounted to the second end portion of the tower member;
a wind energy collection system operatively coupled to the yaw system, the wind energy collection system including a central hub and a plurality of blade members, each of the plurality of blade members includes a root end portion operatively coupled to the central hub, a tip portion that is cantilevered from the central hub, and an intermediate portion; and,
a component manipulating system operatively coupled between at least one of the plurality of blade members and the tower member, the component manipulating system including:
a first blade member support structure including a first end pivotally connected to the tower member that extends to a second end coupled to the one of the plurality of blade members; and,
a winching system operatively connected between the one of the plurality of blade members and the tower member, the winching system being selectively operated to shift the one of the plurality of blade members relative to the tower member, wherein the winching system is supported entirely by the wind turbine.

2. The wind turbine according to claim 1, wherein the component manipulating system further includes: a second blade member support structure including a first end pivotally coupled relative to the tower member and a second end coupled to the one of the plurality of blade members.

3. The wind turbine according to claim 2, wherein the component manipulating system further includes a block member mounted to the one of the plurality of blade members, the block member being operatively coupled to the second end of the another blade member support structure.

4. The wind turbine according to claim 3, wherein the block member includes a first block element operatively connected to a second block element, the first and second block elements being clamped to a portion of the one of the plurality of blade members.

5. The wind turbine according to claim 1, wherein the second end of the first blade member support structure is pivotally mounted to the one of the plurality of blade members.

6. The wind turbine according to claim 5, wherein the second end of the first blade member support structure is pivotally connected to the one of the plurality of blade members proximate to the root end section.

7. The wind turbine according to claim 6, wherein the first blade member support structure includes a first support member and a second support member, each of first and second support members including a first end pivotally connected to the tower member and a second end that is pivotally connected to one of the plurality of blade members.

8. The wind turbine according to claim 7, wherein the first blade member support structure includes a third support member extending between the first end of the first support member and the second end of the second support member.

9. The wind turbine according to claim 5, wherein the first blade member support structure includes at least one cable, the at least one cable selectively shifting at least a portion of the one of the blade members away from the tower member.

10. The wind turbine according to claim 2, wherein the first blade member support structure includes a first blade member support element having a first end and a second end, and a second blade member support element having a first end and a second end, the first end of the first blade member support element being mounted to another of the plurality of blade members and the first end of the second blade member support element being mounted to still another of the plurality of blade members.

11. The wind turbine according to claim 10, wherein each of the first and second blade member support elements includes at least three support rods.

12. The wind turbine according to claim 10, wherein the first end of the first blade member support element is mounted to the root end section of the another of the plurality of blade members and the first end of the second blade member support element is mounted to the root end section of the still another of the plurality of blade members.

13. The wind turbine according to claim 10, wherein the winching system is operatively coupled between the second ends of each of the first and second blade member support elements and a respective one of the plurality of blade members.

14. A method of manipulating a component of a wind turbine, the method comprising:
supporting a portion of one of a plurality of blade members through a blade member support structure operatively coupled to a wind turbine tower member;
disconnecting the one of the plurality of blade members from a central hub; and
pivoting the blade member support structure to lower the one of the plurality of blade members relative to the tower member.

15. The method of claim 14, further comprising: shifting one of at least a portion of the one of the plurality of blade members laterally away from the tower member and a yaw system to expose an internal portion of the central hub.

16. The method of claim 14, further comprising: supporting another portion of the one of the plurality of blade members through another blade member support structure operatively coupled to the tower member.

17. The method of claim 14, wherein lowering the one of the plurality of blade members includes pivoting the blade member support structure.

18. The method of claim 15, wherein shifting the portion of the one of the plurality of blade members includes extending the blade member support structure relative to the tower member.

19. The method of claim 15, wherein shifting the portion of the one of the plurality of blade members includes rotating others of the plurality of blade members, the blade member support structure being operatively coupled to the others of the plurality of blade members.

20. A wind turbine component manipulating system comprising:

a first blade member support structure including a first end that extends to a second end, the first end being configured and disposed to pivotally connected to a wind turbine tower member and the second end being configured and disposed to connect to one of a plurality of wind turbine blade members; and, a winching system, the winching system being configured and disposed to operatively connect between the one of the plurality of wind turbine blade members and the wind turbine tower member, wherein the winching system is supported entirely by the wind turbine.

* * * * *

UNITED STATES PATENT AND TRADEMARK OFFICE
CERTIFICATE OF CORRECTION

PATENT NO. : 8,118,552 B2
APPLICATION NO. : 12/574023
DATED : February 21, 2012
INVENTOR(S) : Jacob Johannes Nies It is certified that error appears in the above-identified patent and that said Letters Patent is hereby corrected as shown below:

Col. 7, lines 48-52;

Claim 3 is shown in the Patent with a typographical error.

3. The wind turbine acccording to claim 2, wherein the component manipulating system further includes a block member mounted to the one of the plurality of blade members, the block member being operatively coupled to the second end of the another blade member support structure.

Claim 3 should properly be read as:

3. The wind turbine according to claim 2, wherein the component manipulating system further includes a block member mounted to the one of the plurality of blade members, the block member being operatively coupled to the second end of the second blade member support structure.

Signed and Sealed this
Fourth Day of September, 2012

David J. Kappos
*Director of the United States Patent and Trademark Office*

UNITED STATES PATENT AND TRADEMARK OFFICE
CERTIFICATE OF CORRECTION

PATENT NO. : 8,118,552 B2  
APPLICATION NO. : 12/574023  
DATED : February 21, 2012  
INVENTOR(S) : Jacob Johannes Nies Page 1 of 1

It is certified that error appears in the above-identified patent and that said Letters Patent is hereby corrected as shown below:

Col. 7, lines 62-65, Claim 6 is shown in the Patent with a typographical error.

6. The wind turbine according to claim 5, wherein the second end of the first blade member support structure is pivotally connected to the one of the plurality of blade members proximate to the root end section.

"... root end section." should read "... root end portion."

Claim 6 should properly be read as:

6. The wind turbine according to claim 5, wherein the second end of the first blade member support structure is pivotally connected to the one of the plurality of blade members proximate to the root end portion.

Signed and Sealed this  
Fifth Day of February, 2013

Teresa Stanek Rea  
*Acting Director of the United States Patent and Trademark Office*